(12) United States Patent
Cazier

(10) Patent No.: US 8,184,869 B2
(45) Date of Patent: May 22, 2012

(54) DIGITAL IMAGE ENHANCEMENT

(75) Inventor: Robert P. Cazier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

(21) Appl. No.: 12/272,945

(22) Filed: Nov. 18, 2008

(65) Prior Publication Data

US 2009/0297029 A1 Dec. 3, 2009

Related U.S. Application Data

(60) Provisional application No. 61/130,453, filed on May 30, 2008.

(51) Int. Cl.
G06K 9/00 (2006.01)
G06K 9/40 (2006.01)
H04N 5/228 (2006.01)
(52) U.S. Cl. ........ 382/118; 382/254; 348/222.1
(58) Field of Classification Search .......... 382/118, 382/218, 236, 190, 195, 199, 209, 294; 348/143, 348/402, 222.1; 396/129
See application file for complete search history.

(56) References Cited

U.S. PATENT DOCUMENTS

| 6,931,147 | B2 * | 8/2005 | Colmenarez et al. ......... 382/118 |
| 6,954,549 | B2 | 10/2005 | Kraft |
| 7,388,971 | B2 * | 6/2008 | Rice et al. .................... 382/118 |
| 7,880,926 | B2 * | 2/2011 | Nakanishi ..................... 358/1.9 |
| 2004/0125112 | A1 | 7/2004 | James |
| 2005/0089206 | A1 | 4/2005 | Rice et al. |
| 2006/0007223 | A1 | 1/2006 | Parker |
| 2006/0092292 | A1 * | 5/2006 | Matsuoka et al. ....... 348/231.99 |
| 2007/0019081 | A1 * | 1/2007 | Nakashima ............. 348/231.99 |
| 2007/0025722 | A1 * | 2/2007 | Matsugu et al. ............. 396/263 |
| 2007/0139512 | A1 * | 6/2007 | Hada et al. ................. 348/14.01 |
| 2007/0291334 | A1 * | 12/2007 | Nakanishi ..................... 358/509 |
| 2008/0025576 | A1 * | 1/2008 | Li et al. ........................ 382/118 |
| 2009/0141983 | A1 * | 6/2009 | Bing et al. .................... 382/195 |

OTHER PUBLICATIONS

Pantic, M.; Rothkrantz, L.J.M.; , "Automatic analysis of facial expressions: the state of the art," Pattern Analysis and Machine Intelligence, IEEE Transactions on , vol. 22, No. 12, pp. 1424-1445, Dec. 2000.*

Ito, A.; Xinyue Wang; Suzuki, M.; Makino, S.; , "Smile and laughter recognition using speech processing and face recognition from conversation video," Cyberworlds, 2005. International Conference on , vol., No., pp. 8 pp. 444, Nov. 23-25, 2005.*

* cited by examiner

*Primary Examiner* — Andrae S Allison

(57) ABSTRACT

Methods and systems for enhancing a digital image include analyzing the digital image to determine if the digital image includes a facial component. Facial characteristics of the facial component are determined for each image that does include at least one facial component. The digital image is then modified based on the facial characteristics.

20 Claims, 2 Drawing Sheets

DIGITAL IMAGE ENHANCEMENT

CROSS REFERENCE TO RELATED APPLICATIONS

This Application claims the benefit of provisional patent application Ser. No. 61/130,453, filed May 30, 2008; entitled "Digital Image Enhancement" which application is incorporated by reference herein as if reproduced in full below.

BACKGROUND OF THE INVENTION

A digital camera takes video or still images, or both, by capturing a subject, scene or view on a light-sensitive sensor that generates a corresponding electronic signal. Digital cameras have become increasingly popular in recent years and technology advances are resulting in increased performance capabilities. As a result, more and more amateur photographers are now using digital cameras. Unlike professional photos, photos produced by amateur users often suffer from poor image quality.

Digital post-processing methods have been proposed to improve image quality. Many such methods have been quite successful for satellite photos, airborne photos and medical images but generally do not work well on consumer photos. Recently, some computer programs have been developed for digital image enhancement of consumer pictures. An example of a successful program that provides digital image enhancement is Photoshop, a software product manufactured by Adobe. Such software includes a large repository of processing tools and generally requires a level of expertise that many casual photographers do not possess. Therefore, this is not a particularly useful tool for amateur photographers, as they cannot easily determine the proper tools to use or the proper parameters to specify.

DETAILED DESCRIPTION OF THE INVENTION

The present invention generally involves enhancing digital images, particularly digital images that contain one or more human faces in a scene. Representative embodiments include, among other things, methods and systems for analyzing facial characteristics in a digital image and modifying the digital image based on the facial characteristics. For instance, if the subject of the digital image is frowning, the background of the image may be made blue and less saturated, thereby providing an artistic rendering reflecting the subject's mood. In general, digital images are enhanced with image enhancement software that analyzes a digital image to detect if the image contains one or more facial components (that is, whether the image contains any human faces), determines the facial characteristics of the facial components, and modifies the digital image based on the facial characteristics.

Figure 1:
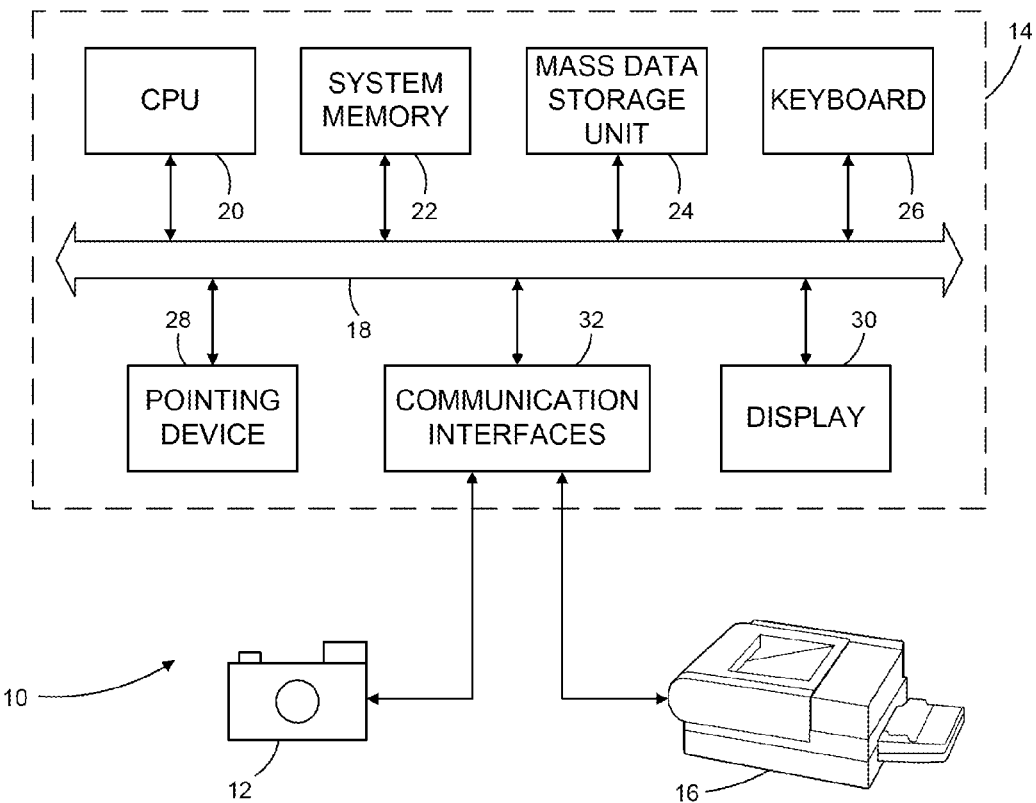
FIG. 1 is a block diagram depicting one embodiment of a computer-based system for implementing image enhancement software.

Referring now to the drawings wherein identical reference numerals denote the same elements throughout the various views, FIG. 1 shows one embodiment of a computer-based system 10 that can be used to implement the image enhancement software. As will be described in more detail below, the image enhancement software resides within one or more computer readable media of the system 10. Alternatively, the image enhancement software could reside on a remote computer readable medium and be accessed by the system 10 via the Internet or other computer network. As used herein, the term "computer readable medium" refers generally to any medium (including both volatile and non-volatile media, as well as removable and non-removable media) from which stored data can be read by a computer or similar device. Computer readable media include, but are not limited to, hard disks, floppy disks, magnetic cassettes, flash memory cards, flash drives, optical media such as a CD-ROM, CD-R, CD-RW, DVD-ROM, DVD-RAM and the like, random access memories (RAMs), read only memories (ROMs), and other integrated circuit memory devices.

The system 10 includes a digital camera 12 for capturing video and/or still images in digital format, a computing device 14, and a printer 16. The computing device 14 can be any of a number of different types of computing devices, such as portable laptop computers, desktop computers, server computers, personal digital assistants, palmtop computers and the like. In general, the computing device 14 includes a system bus 18 for communicating information and a central processing unit (CPU) 20 for processing information and instructions. The CPU 20 is coupled with the bus 18 and may comprise one or more microprocessors or other type of processors. The computing device 14 also includes a system memory 22 and a mass data storage unit 24 coupled with the bus 18. The system memory 22 generally includes computer readable media for storing information and instructions for the CPU 20. This can be in the form of volatile memory such as random access memory (RAM) and/or non-volatile memory such as read only memory (ROM). The mass data storage unit 24 may include one or more types of removable and/or non-removable computer readable media. These include, but are not limited to, a hard disk, a floppy disk, an optical disk such as a CD-ROM, CD-R, CD-RW, DVD-ROM, DVD-RAM or other optical media, and flash memory.

A keyboard 26 and a pointing device 28 are coupled to the bus 18 to permit a user to input information into the computing device 14. The pointing device 28 can comprise any one of a number of well known devices such as a mouse, a track-ball, a track pad, an optical tracking device, a touch screen, etc. A display 30 for displaying information to the user is also coupled to the bus 18. The system 10 also includes one or more communication interfaces 32 coupled with the bus 18 for enabling the system 10 to connect with other electronic devices. In one embodiment, the communication interfaces 32 include a serial communication port. Other possible interfaces include any of a number of well known communication standards and protocols, such as Universal Serial Bus (USB), Ethernet, FireWire (IEEE 1394), parallel, small computer system interface (SCSI), infrared (IR) communication, Bluetooth wireless communication, etc.

The digital camera 12 may be detachably coupled to the computing device 14 via one of the communication interfaces 32 so that digital images captured by the camera 12 can be downloaded and stored in the computing device 14, such as at the mass data storage unit 24. The printer 16 is also coupled to the computing device 14 through one of the communication interfaces 32 so that images stored in the computing device 14 can be printed. The printer 16 can include one or more processing elements (not shown) as well as one or more memory elements (not shown).

Those skilled in the art will recognize that there are many alternative ways of transferring digital images captured by the camera 12 to the computing device 14, including without limitation storing them on a permanent or reusable medium, such as flash memory cards, flash drives, floppy disks, CD-ROMs, etc. Furthermore, the camera 12 could be coupled directly to the printer 16 in order to print captured images directly from the camera 12. The printer 16 could also include a floppy disk, CD-ROM and/or flash memory drive for receiving images.

Figure 2:
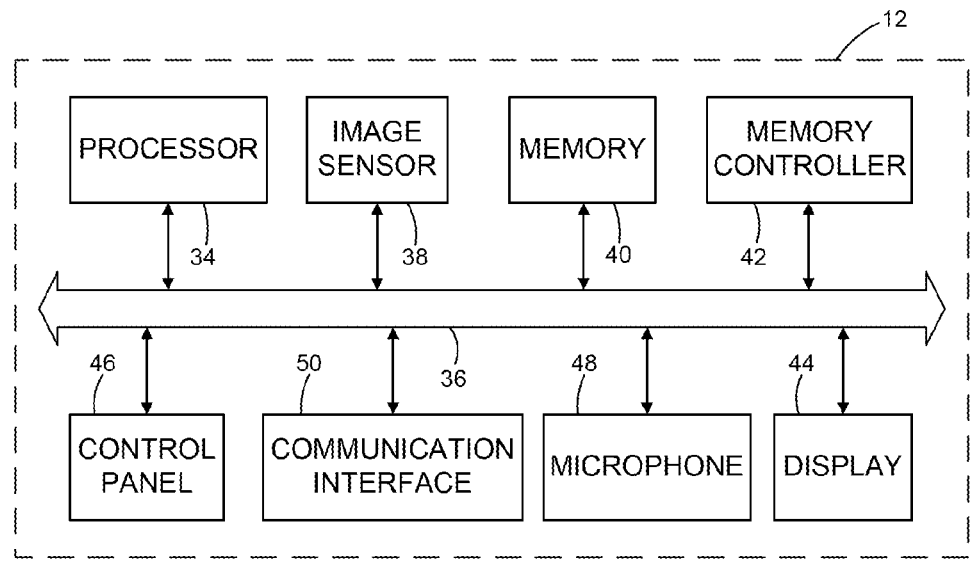
FIG. 2 is a block diagram depicting one embodiment of a digital camera.

FIG. 2 shows one embodiment of the digital camera 12 in more detail. The digital camera 12 includes a processor 34 that communicates over a data bus 36 with an image sensor 38, a memory 40, and a memory controller 42. A display 44 and a control panel 46, coupled to the data bus 36, are provided on the body of the digital camera 12 for input/output with the user. The display 44 can be an LCD screen, gas plasma screen, or other display device. The control panel 46 typically includes a set of control selectors including buttons, switches, knobs, or the like. A microphone 48 can be provided to detect ambient sounds. A communication interface 50 coupled to the data bus 36 enables captured images to be downloaded. Power is provided by a power unit such as a battery (not shown).

A lens assembly (not shown) operates in a known manner to focus light onto the image sensor 38. The image sensor 38 is a device, such as a charge-coupled device (CCD) or a complimentary metal oxide semiconductor (CMOS) sensor, which is capable of converting radiant energy into an electronic signal. The image sensor 38 thus captures incident radiant energy and converts the radiant energy into a digital image representative of the scene projected onto the image sensor 38 by the lens assembly.

The processor 34 operates under control of programs or software that are stored in the memory 40 to which the processor 34 is connected. The memory controller 42 is connected to the processor 34 and the memory 40 for controlling the handling of images captured by the digital camera 12. The captured images may be stored on a removable memory card (not shown) that is removably plugged into the memory controller 42. Such captured images are made available to the user for viewing on the display 44, which is driven by the processor 34. The user sees a representative image of the view on the display 44 and controls the digital camera 12 via the control panel 46, which are both communicated with the processor 34 of the digital camera 12.

In one embodiment, the image enhancement software is implemented on the digital camera 12 through one or more software modules or libraries containing program instructions pertaining to the image enhancement methods described herein. Specifically, the image enhancement software could reside in the camera's memory 40 and be executed by the processor 34. In another possible embodiment, the image enhancement software is implemented on the computing device 14. In this case, the image enhancement software could reside in the system memory 22 and be executed by the CPU 20. In yet another embodiment, the image enhancement software is implemented on the printer 16; the software resides in the printer's memory elements and is executed by the printer's processing elements.

Figure 3:
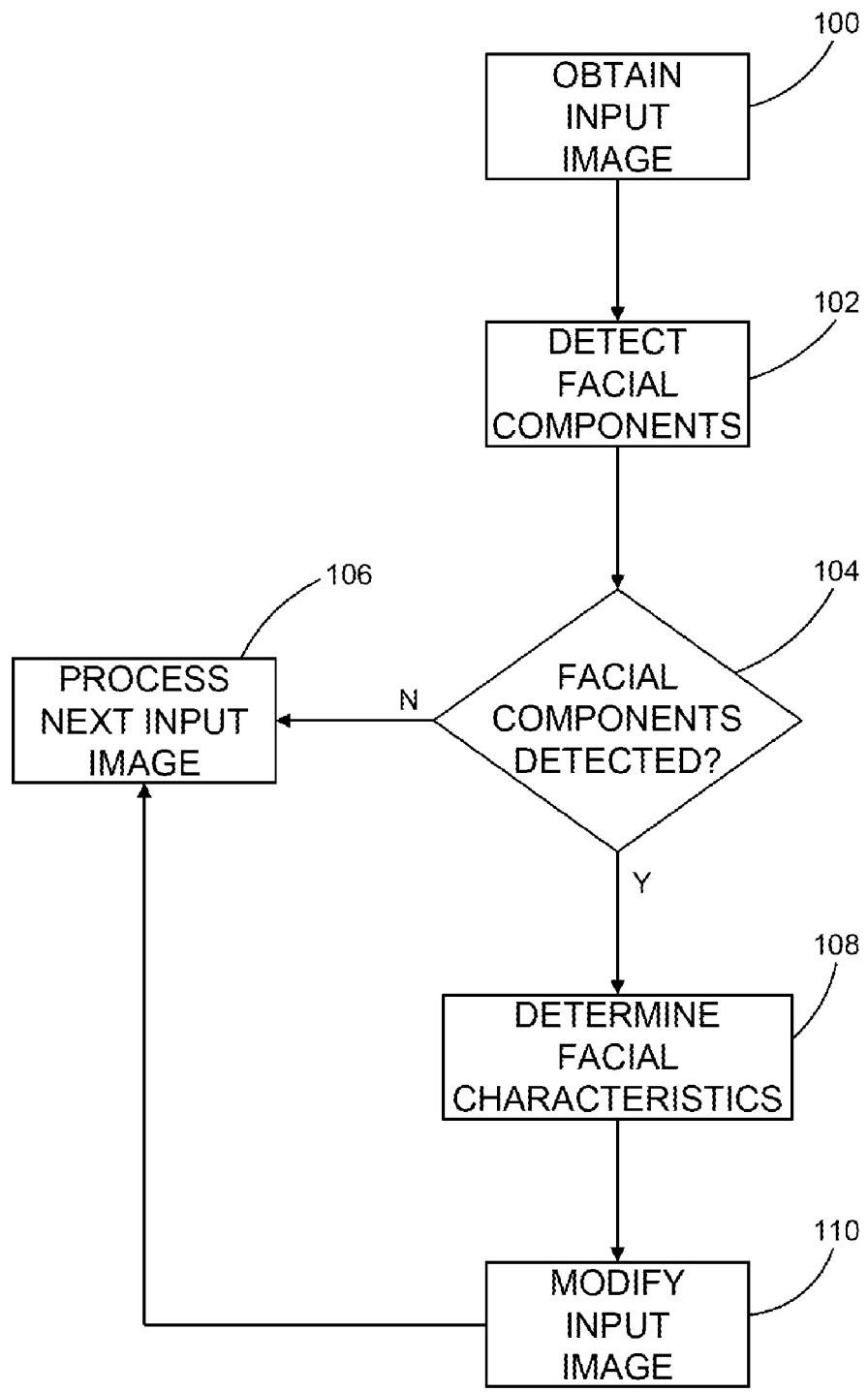
FIG. 3 shows a flow chart depicting one embodiment of a process for enhancing digital images.

Referring to FIG. 3, one embodiment of a method by which the image enhancement software enhances digital images is described. The method begins at block 100 where an input image (i.e., a digital image that has been captured by the digital camera 12) is received for processing by the image enhancement software. The input image generally comprises a plurality of pixels that can be considered, as least logically, to be organized in an array or matrix having a plurality of rows and columns. In other words, each pixel has an x-coordinate, which identifies the particular column within which the pixel is located, and a y-coordinate, which identifies the particular row within which the pixel is located. Thus, each pixel can be identified by its unique x, y coordinates.

Next, at block 102, the input image is analyzed to detect if the image has one or more facial components. The image enhancement software searches for and identifies any faces within the input image. A face detection algorithm is applied to the input image for detecting facial components in the image. Any suitable face detection algorithm can be used, many of which are known. In one embodiment, the image enhancement software utilizes the face detection algorithm described in U.S. Pat. No. 7,099,510, issued Aug. 29, 2006 to Jones et al. and titled METHOD AND SYSTEM FOR OBJECT DETECTION IN DIGITAL IMAGES. Alternatively, the image enhancement software could employ other face detection algorithms, such as the algorithms described in H. Schneiderman, T. Kanade, "A Statistical Method for 3D Object Detection Applied to Faces and Cars," IEEE Conference on Computer Vision and Pattern Recognition (CVPR 2000) or in U.S. Pat. No. 5,164,992 issued Nov. 17, 1992 to Turk et al. and titled FACE RECOGNITION SYSTEM.

At block 104, the image enhancement software considers whether the face detection algorithm detected any facial components in the input image. If no facial components are detected, the processing of the input image is stopped and the method proceeds to processing the next input image (assuming that multiple digital images have been captured by the camera 12) as shown at block 106. If the input image does have a facial component, the method proceeds to block 108 where one or more facial characteristics of the facial component or components are determined. Generally, certain facial features are analyzed for commonality with certain emotions to determine the subject's emotions or mood. In other words, there are some facial expressions that are commonly associated with a particular emotion. Emotions such as happiness, sadness, surprise, fear, anger, and disgust are universally associated with distinct facial expressions or characteristics. Some examples of applicable commonalities include a frown indicating that the subject is sad and a scream indicating that the subject is scared or angry. Whether or not the eyes are fully open and the condition of the pupil with respect to the iris are examples of other characteristics indicative of emotions. The image enhancement software thus analyzes certain facial features to determine the subject's facial expression, and then identifies the subject's emotion as being the emotion that is associated with the detected facial expression.

An emotion detection algorithm is applied to the input image for detecting the facial characteristics and determining the subject's emotions. In general, the facial components of the input image can be analyzed to find and identify the positions and shapes of facial features, particularly facial features such as the mouth and eyes that tend to indicate emotions. The presence of static cues such as wrinkles could also be detected (e.g., horizontal lines or wrinkles in the forehead are indicative of frowning). In one embodiment, identification of these features could be accomplished using an edge detection filter, which finds locations in the input image where the intensity changes sharply. These locations or edges represent transitions in the facial component that indicate the presence of a facial feature. Common edge detection filters include search-based and zero-crossing based schemes. A search-based system detects edges by looking for maxima and minima in the first derivative of the input image, usually local directional maxima of the gradient magnitude. The zero-crossing based methods search for zero crossings in the second derivative of the input image in order to find edges, usually the zero-crossings of the Laplacian or a non-linear differential expression.

These techniques can be assisted by utilizing known anatomical attributes in locating facial features. For example, the human mouth is roughly centered horizontally and approximately one-third of the way up from the bottom of the face. In addition, the audio signal produced by the microphone 48 can be analyzed to supplement or assist determining the subject's emotions. For instance, the audio signal can be analyzed to determine whether the subject of the input image is screaming, crying, laughing, etc., thereby providing further information regarding, or confirmation of, the subject's emotions.

In another possible embodiment, the image enhancement software can utilize the method for determining a subject's emotions or mood from an image described in U.S. Patent Application Publication No. 2005/0089206, published Apr. 28, 2005 in the name Rice et al. and titled ROBUST AND LOW COST OPTICAL SYSTEM FOR SENSING STRESS, EMOTION AND DECEPTION IN HUMAN SUBJECTS.

Next, at block 110, the image enhancement software modifies the input image based on the detected facial characteristics. Specifically, once the subject's emotion or mood has been determined by analyzing the facial characteristics, the input image is modified to provide an artistic rendering of the image that reflects the subject's mood. There are many examples of how the image can be modified to reflect the subject's mood. For instance, if the subject of the image is found to be sad, the background of the image may be made blue and less saturated. Conversely, the background of the image could be made brighter if the subject is found to be happy. If the subject is screaming, the image may be artificially blown out or clipped to increase the strength of the image. In addition, if the image contains multiple facial components (indicating a group shot), the image could be rendered differently than images having a single face.

The image modification can be conducted in either an active rendering mode or a play back mode. In the active rendering mode, the image enhancement software automatically modifies the image based on the subject's emotion without input from the user. In instances where the image enhancement software is implemented on the digital camera 12 in the active rendering mode, the software would be automatically activated whenever the camera 12 captures an image. In the playback mode, the user is presented with one or more modified images (i.e., output images). For example, if the image enhancement software is implemented on the digital camera 12 in the playback mode, the software could present multiple output images to choose from. The user could scroll through and view the suggested output images on the camera's display 44, and select one or more of the output images. Similarly, if the image enhancement software is implemented on the computing device 14 in the playback mode, multiple output images that the user could choose from could be shown on the computing device's display 30.

In either mode, the output image can be automatically saved with the original input image or can overwrite and replace the input image depending on the user's preference. Once the enhancement of the image is completed, the software proceeds to processing the next input image (assuming that multiple digital images have been captured by the camera 12) as shown at block 106. In other words, the process is repeated for each image captured by the camera 12 until all images have been processed.

While specific embodiments of the present invention have been described, it should be noted that various modifications thereto could be made without departing from the spirit and scope of the invention as defined in the appended claims.

What is claimed is:

1. A method of enhancing a digital image, the method being performed by one or more processors and comprising:
   analyzing the digital image to determine whether the digital image includes a facial component, the digital image including a background;
   determining facial characteristics of the facial component by (i) analyzing facial features to detect expression, and (ii) identifying an emotion based on the expression; and
   modifying the digital image based on the facial characteristics to reflect the identified emotion, wherein modifying the digital image includes altering the background.

2. The method of claim 1, further comprising capturing the digital image via a camera component.

3. The method of claim 1, wherein altering the background includes changing a color of the background.

4. The method of claim 1, wherein modifying the digital image includes enabling a user to save the modified image.

5. The method of claim 1, wherein analyzing facial features includes using an edge detection filter to analyze the facial features.

6. The method of claim 1, wherein identifying the emotion includes using ambient audio signals to assist in identifying the emotion.

7. The method of claim 1, further comprising presenting multiple modified images for a user to choose from.

8. A non-transitory computer readable medium storing instructions that, when executed by one or more processors, cause the one or more processors to perform a method for enhancing a digital image comprising:
   analyzing the digital image to determine whether the digital image includes a facial component, the digital image including a background;
   determining facial characteristics of the facial component by (i) analyzing facial features to detect expression, and (ii) identifying an emotion based on the expression; and
   modifying the digital image based on the facial characteristics to reflect the identified emotion, wherein modifying the digital image includes altering the background.

9. The computer readable medium of claim 8, wherein the instructions further cause the one or more processors to perform a method comprising capturing the digital image via a camera component.

10. The computer readable medium of claim 8, wherein altering the background includes changing a color of the background.

11. The computer readable medium of claim 8, wherein modifying the digital image includes enabling a user to save the modified image.

12. The computer readable medium of claim 8, wherein analyzing facial features includes using an edge detection filter to analyze the facial features.

13. The computer readable medium of claim 8, wherein identifying the emotion includes using ambient audio signals to assist in identifying the emotion.

14. The computer readable medium of claim 8, wherein the instructions further cause the one or more processors to perform a method comprising causing multiple modified images to be presented.

15. A computing device comprising:
   a camera component;
   a processor; and
   a memory coupled to the processor, the memory having image enhancement software stored therein that causes the processor to:

analyze one or more digital images captured by the camera component to determine whether each of the one or more digital images include a facial component;

for each of the one or more digital images that include a facial component, determine a facial characteristic of the facial component by (i) analyzing facial features to detect expression, and (ii) identifying an emotion based on the expression; and modify at least one of the one or more digital images based on the facial characteristics to reflect the identified emotion, wherein modifying at least one of the one or more digital images includes altering a background of the at least one or more digital images.

16. The computing device of claim 15, wherein the image enhancement software alters the background by changing a color of the background.

17. The computing device of claim 15, wherein the image enhancement software modifies the digital image to by enabling a user to save the modified image.

18. The computing device of claim 16, wherein the image enhancement software includes an edge detection filter.

19. The computing device of claim 15, further comprising a microphone coupled to the processor, wherein the image enhancement software causes the processor to use audio signals from the microphone to assist in identifying the emotion.

20. The computing device of claim 15, further comprising a display coupled to the processor, wherein the image enhancement software causes the processor to present one or more modified images on the display.

* * * * *

UNITED STATES PATENT AND TRADEMARK OFFICE
CERTIFICATE OF CORRECTION

PATENT NO.        : 8,184,869 B2                                    Page 1 of 1
APPLICATION NO.   : 12/272945
DATED             : May 22, 2012
INVENTOR(S)       : Robert P. Cazier It is certified that error appears in the above-identified patent and that said Letters Patent is hereby corrected as shown below:

In column 8, line 2, in Claim 17, after "image" delete "to".

In column 8, line 4, in Claim 18, delete "claim 16," and insert -- claim 15, --, therefor.

Signed and Sealed this
Fourth Day of December, 2012

David J. Kappos
*Director of the United States Patent and Trademark Office*